No. 888,982. PATENTED MAY 26, 1908.
C. G. ETTE.
WASHER.
APPLICATION FILED OCT. 12, 1907.

Witnesses:
Geo. R. Ladson
Wells L. Church

Inventor:
Charles G. Ette.
By Bakewell Cornwall Attys.

UNITED STATES PATENT OFFICE.

CHARLES G. ETTE, OF ST. LOUIS, MISSOURI, ASSIGNOR TO ETTE INVESTMENT COMPANY, OF ST. LOUIS, MISSOURI, A CORPORATION OF MISSOURI.

WASHER.

No. 888,982.

Specification of Letters Patent.

Patented May 26, 1908.

Application filed October 12, 1907. Serial No. 397,214.

*To all whom it may concern:*

Be it known that I, CHARLES G. ETTE, a citizen of the United States, residing at St. Louis, Missouri, have invented a certain new and useful Improvement in Washers, of which the following is a full, clear, and exact description, such as will enable others skilled in the art to which it appertains to make and use the same, reference being had to the accompanying drawings, forming part of this specification, in which—

Figure 1:
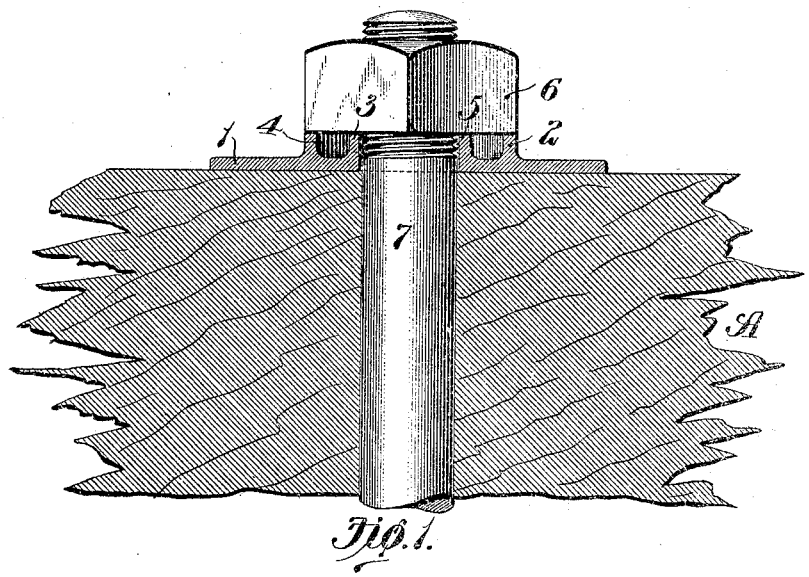
Figure 2:
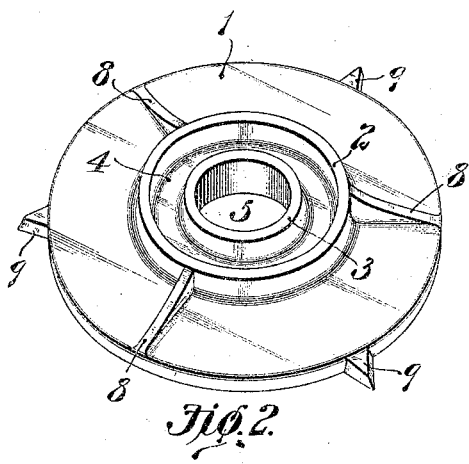
Figure 3:
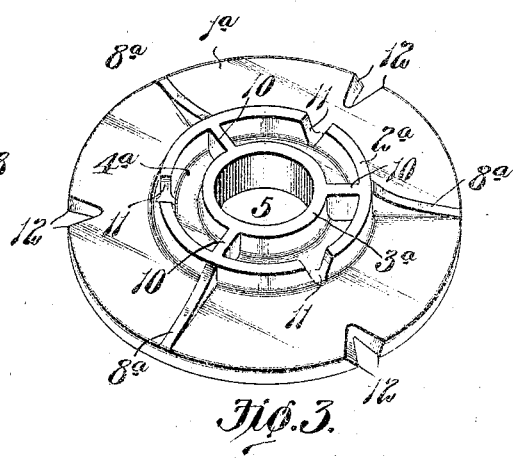

Figure 1 is a view showing my improved washer in operative position, the washer being in section; Fig. 2 is a perspective view of the preferred form of my invention; and Fig. 3 is a perspective view of a modified form of my invention.

This invention relates to washers and particularly to the type of washer shown in my prior United States Patent No. 759,599, dated May 10, 1904.

The main object of my present invention is to provide a comparatively thin malleable iron washer which is so constructed that water can not collect between the underneath side of the washer and the object upon which the washer rests or with which it contacts.

Another object of my invention is to provide a novel form of washer which can be easily converted into a nut lock.

Referring to Figs. 1 and 2 of the drawings which show the preferred form of my invention, 1 designates the base of the washer and 2 and 3 designate flanges on the upper side of the base which are preferably circular or ring-shaped, said flanges being arranged concentrically so that they will be spaced away from each other to form a channel 4. The underneath surface of the base 1 is perfectly flat and is unbroken from the bolt opening 5 to the periphery of the base so that it will be impossible for water to collect between the underneath side of the washer and the object A upon which the washer rests, the flanges 2 and 3 on the upper side of the base forming a bearing surface for the nut 6 that is mounted on the bolt or rod 7 which passes through the washer. The object of forming the channel 4 between the circular flanges 2 and 3 is to produce a washer in which the material is of uniform thickness so that it will anneal properly and also to eliminate surplus material that would add to the weight of the washer.

Preferably, the base 1 is provided on its upper side with tapered ribs 8 that are formed integral with the flange 2 to strengthen same and if desired the periphery of the base can be provided with integral projections 9 that can be forced into the object upon which the washer rests so as to prevent the washer from turning.

In Fig. 3 I have shown a slightly modified form of my invention wherein the ring-shaped flanges 2ª and 3ª on the upper side of the base 1ª are connected together by integral cross webs 10 which impart additional strength to the washer, said cross webs being arranged in alinement with the tapered ribs 8ª. The flange 2ª is also provided with notches or openings 11 which permit any water that collects in the channel 4ª to drain off and these notches 11 also perform another function; namely, they enable a cold chisel or other suitable tool to be inserted for the purpose of striking up a bur on the flange 2ª to prevent the nut from turning. The base 1ª can be provided at its periphery with projections, as shown in Fig. 2, to prevent it from turning, or notches can be formed in the periphery of the base, as shown in Fig. 3, so as to produce points 12 that can be bent downwardly into engagement with the object on which the washer rests. If the washer rests on or contacts with a metal object a bur can be struck up on the object so as to lie in one of the notches in the periphery of the base and thus prevent the washer from turning.

Having thus described my invention, what I claim as new and desire to secure by Letters Patent is:

1. A washer comprising a base provided on its upper side with a plurality of substantially continuous flanges that form a bearing surface for a nut, one of said flanges being arranged inside of the others; substantially as described.

2. A washer comprising a base provided on its upper side with a plurality of concentric ring-shaped flanges that form a bearing surface for a nut; substantially as described.

3. A washer comprising a base provided on its upper side with a plurality of concentric ring-shaped flanges that are separated from each other to form a channel, the upper edges of said flanges forming a bearing surface for a nut; substantially as described.

4. A washer comprising a base provided on its upper side with a plurality of concentrically arranged ring-shaped flanges, cross webs formed integrally with said flanges, and strengthening ribs formed integral with the base and the outer flange; substantially as described.

5. A washer comprising a base having a flat and unbroken underneath face, and a plurality of concentrically arranged flanges on the upper side of said base that form a bearing surface for a nut, said flanges being separated from each other to form a channel; substantially as described.

6. A washer comprising a base having a flat underneath face, and a plurality of concentric ring-shaped flanges on the upper side of said base to form a bearing surface for a nut, the outer flange being provided with a notch or opening; substantially as described.

7. A washer comprising a base having its underneath surface flat and unbroken, a plurality of concentric ring-shaped flanges on the upper side of said base adapted to form a bearing surface for a nut, said flanges being spaced away from each other to form a channel, cross webs formed integral with said flanges, and notches or openings formed in the outer flange; substantially as described.

In testimony whereof I hereunto affix my signature in the presence of two witnesses, this ninth day of October 1907.

CHARLES G. ETTE.

Witnesses:
EDWARD SCHWIDDE,
WALTER C. RAITHEL